(12) United States Patent
Spiroff et al.

(10) Patent No.: US 8,871,094 B2
(45) Date of Patent: Oct. 28, 2014

(54) WASTEWATER TREATMENT FACILITY AND BIOREACTOR FOR TREATING WASTEWATER FROM OIL AND GAS EXPLORATION AND PRODUCTION

(71) Applicant: R N Industries, Inc., Roosevelt, UT (US)

(72) Inventors: Kerry J. Spiroff, Sandy, UT (US); Nathan Zaugg, Farmington, UT (US); Huiwei Yu, Draper, UT (US)

(73) Assignee: R N Industries, Inc., Roosevelt, UT (US)

( * ) Notice: Subject to any disclaimer, the term of this patent is extended or adjusted under 35 U.S.C. 154(b) by 0 days.

(21) Appl. No.: 13/856,135

(22) Filed: Apr. 3, 2013

(65) Prior Publication Data

US 2014/0027376 A1 Jan. 30, 2014

Related U.S. Application Data

(60) Provisional application No. 61/677,004, filed on Jul. 30, 2012.

(51) Int. Cl.
*C02F 3/00* (2006.01)
*C02F 3/28* (2006.01)

(52) U.S. Cl.
CPC ........................................ *C02F 3/28* (2013.01)
USPC ............ 210/603; 210/605; 210/799; 210/540

(58) Field of Classification Search
USPC .................................. 210/603, 605, 799, 540
See application file for complete search history.

(56) References Cited

U.S. PATENT DOCUMENTS

| | | | |
|---|---|---|---|
| 4,032,439 A | | 6/1977 | Oldham |
| 4,483,774 A | * | 11/1984 | Brill et al. ...................... 210/788 |
| 4,771,246 A | * | 9/1988 | Boryta et al. .................. 324/559 |
| 4,985,682 A | | 1/1991 | Boryta |
| 5,562,759 A | * | 10/1996 | Morgan et al. .................. 96/155 |
| 5,587,080 A | * | 12/1996 | Landine et al. ............... 210/603 |
| 5,591,347 A | * | 1/1997 | Cairo et al. ................... 210/703 |
| 5,807,485 A | | 9/1998 | Caplan et al. |
| 5,861,095 A | | 1/1999 | Vogel et al. |

(Continued)

FOREIGN PATENT DOCUMENTS

| | | |
|---|---|---|
| KR | 100817041 A1 | 3/2008 |
| WO | 00/39031 A1 | 7/2000 |

OTHER PUBLICATIONS

United States Patent and Trademark Office As the International Searching Authority, "International Search Report and Written Opinion," mailed Feb. 21, 2014, in related PCT application No. PCT/US2013/052665.

(Continued)

*Primary Examiner* — Chester Barry
(74) *Attorney, Agent, or Firm* — Durham Jones & Pinegar Intellectual Property Law Group (57) ABSTRACT

Volatile organic compounds (VOCs), such as BTEX methanol and other non-phase separable hydrocarbons may be removed from wastewater obtained from oil or gas exploration or production operations by way of a bioreactor. The bioreactor may employ anaerobic microorganisms that metabolize various VOCs. In some embodiments, such a bioreactor may be configured to treat process flow rates of thousands of barrels of wastewater per hour. Such a bioreactor may comprise a large vessel at a larger water treatment site.

6 Claims, 3 Drawing Sheets

(56) References Cited

U.S. PATENT DOCUMENTS

| | | | |
|---|---|---|---|
| 6,361,249 B1 | 3/2002 | Hodgkinson et al. | |
| 6,524,028 B2 * | 2/2003 | Bryan | 405/81 |
| 6,855,253 B2 * | 2/2005 | Baumgartner et al. | 210/603 |
| 7,153,423 B2 * | 12/2006 | Gordon et al. | 210/242.1 |
| 7,468,133 B1 | 12/2008 | Norton | |
| 8,097,163 B1 * | 1/2012 | Stewart et al. | 210/653 |
| 2003/0213745 A1 * | 11/2003 | Haerther et al. | 210/602 |
| 2005/0218037 A1 * | 10/2005 | Pickler et al. | 208/49 |
| 2006/0060525 A1 * | 3/2006 | Hoffland | 210/603 |
| 2006/0065593 A1 * | 3/2006 | Hansen et al. | 210/603 |
| 2006/0223154 A1 | 10/2006 | Kohr | |
| 2008/0053896 A1 * | 3/2008 | Shafer et al. | 210/605 |
| 2008/0110828 A1 | 5/2008 | Yerushalmi et al. | |
| 2009/0101572 A1 | 4/2009 | Sullivan et al. | |
| 2009/0236281 A1 * | 9/2009 | Shafer et al. | 210/603 |
| 2010/0028976 A1 | 2/2010 | Hu et al. | |
| 2010/0059226 A1 | 3/2010 | Termine et al. | |
| 2010/0126936 A1 | 5/2010 | Jones et al. | |
| 2010/0297749 A1 | 11/2010 | Aravanis et al. | |
| 2011/0092726 A1 | 4/2011 | Clarke | |
| 2011/0132815 A1 | 6/2011 | Angelilli et al. | |
| 2011/0168021 A1 | 7/2011 | Vellinga et al. | |
| 2011/0180475 A1 | 7/2011 | Ahmadun et al. | |
| 2011/0219668 A1 | 9/2011 | Cramwinckel et al. | |
| 2012/0012524 A1 * | 1/2012 | Yang et al. | 210/603 |
| 2012/0097194 A1 * | 4/2012 | McDaniel et al. | 134/26 |
| 2012/0168372 A1 | 7/2012 | Baldwin et al. | |
| 2012/0289436 A1 | 11/2012 | Woodward et al. | |

OTHER PUBLICATIONS

Nicholson, "Biodegradation of Petroleum Hydrocarbons by Halophilic and Halotolerant Microorganisms," Southern Arkansas University, Thesis, Magnolia, Arkansas Dec., 2005, p. 1, 2, 7, 21, 50.

Frazer, "Toluene Metabolism Under Anaerobic Conditions: A Review," Anaerobe, (1995), 1, 293-303.

Spormann, "Metabolism of alkylbenzenes, alkanes, and other hydrocarbons in anaerobic bacteria," Biodegradation 11:85-105, 2000.

Zandvoort et al, "Methanol degradation in granular sludge reactors at sub-optimal metal concentrations: role of iron, nickel and cobalt," Enzyme and Microbial Technology, vol. 33, Issues 2-3, Aug. 13, 2003, pp. 190-198.

* cited by examiner

WASTEWATER TREATMENT FACILITY AND BIOREACTOR FOR TREATING WASTEWATER FROM OIL AND GAS EXPLORATION AND PRODUCTION

CROSS-REFERENCE TO RELATED APPLICATIONS

This application is a non-provisional application claiming priority under 35 U.S.C. §119(e) to U.S. Patent Application No. 61/677,004 filed on Jul. 30, 2012, and titled "METHODS, APPARATUSES, SYSTEMS AND FACILITIES FOR TREATING WASTEWATER FROM EXPLORATION FOR AND PRODUCTION OF OIL AND GAS," which application is expressly incorporated herein in its entirety by this reference.

TECHNICAL FIELD

This disclosure relates generally to the treatment of wastewater recovered from the exploration for and production of oil and gas. More specifically, this disclosure relates to apparatuses, systems, facilities and methods for removing non-phase separable organic content from wastewater, including dissolved volatile organic compounds (VOCs), which are widely designated by federal and state regulators as hazardous air pollutants (HAPs).

RELATED ART

Along with oil or gas, water is typically present in oil and gas reservoirs. Thus, when oil and gas are removed from the ground, they are usually accompanied by water. Since the density of water exceeds the densities of both oil and gas, water is typically located beneath oil or gas within a well. As the well is depleted of its oil or gas, more and more naturally occurring water accompanies oil or gas out of the well.

In addition, water that has been introduced into a well (i.e., which is not naturally occurring within an oil and gas reservoir) may also be removed with oil or gas from the well. Among other purposes, water may be introduced into a well in a process known as "flooding" to displace oil or gas within the reservoir. Water may be injected into a well to increase pressure within the reservoir and to thereby stimulate the well to maximize its production of oil or gas, a technique that is known in the art as "hydraulic fracturing." Like naturally occurring water, water that has been introduced into a well accompanies oil or gas out of the well. "Flow-back water" is water that has been introduced into the well and subsequently removed from the ground along with oil or gas. "Produced water" is naturally occurring ground water that has been removed from a well.

Regardless of its origin, any water that is removed from an oil or gas well is considered to be an exploration and production (E&P) waste. Specifically, E&P wastewater can include a number of hazardous air pollutants (HAPs), including volatile organic compounds (VOCs), such as the so-called "BTEX" materials; i.e., benzene, toluene, ethylbenzene and xylene. In addition, in colder environments, methanol ($CH_3OH$), another HAP, may be used as an antifreeze in water introduced into a well and, thus, be present in water removed from the well.

Despite the presence of HAPs, E&P wastewater has conventionally been transported to water treatment, or remediation, facilities, where phase (i.e., hydrocarbons immiscible in water) separable hydrocarbons and sludge (i.e., hydrocarbon coated or impregnated solids) may be removed from the E&P wastewater before disposing of it. One of the more cost-efficient methods for disposing of E&P wastewater employs evaporation ponds. From an evaporation pond, the E&P wastewater may be introduced back into the environment (e.g., into the atmosphere as water vapor; less desirably, through the ground; etc.), along with a portion of the vaporized HAPs that exited the well with the water. From an environmental perspective, the placement of E&P wastewater that includes dissolved HAPs into evaporation ponds is less desirable than other, more expensive disposal methods.

The Environmental Protection Agency (EPA) and analogous agencies of various states have implemented environmental regulations requiring that E&P wastewater be treated before it may be placed into evaporation ponds. The most stringent regulations mandate that E&P wastewater be "treated by passing the E&P wastewater through various filters, enhanced gravity separation, emulsification removers, chemical treatment and other advanced treatment devices. Such processes produce gasoline and diesel range hydrocarbons, waxes, heavy oils and oil-coated and impregnated sediment waste that are reclaimed, burned, land farmed or landfilled. Although advanced physical treatment devices are able to polish phase separable VOCs from E&P wastewater, they do not capture soluble VOCs, some of which are HAPs, nor will they capture other organic components from the E&P wastewater. Thus, even when advanced physical treatment techniques are used to treat E&P wastewater, significant amounts of dissolved VOCs remain in the treated water when it is introduced into an evaporation pond, potentially polluting the atmosphere and ground and surface water.

SUMMARY

This disclosure relates to the treatment of exploration and production (E&P) wastewater, which is also more simply referred to herein as "wastewater," recovered from oil and gas exploration and production sites. In addition to being useful for treating E&P wastewater, the apparatuses, systems and methods disclosed herein may be used to treat wastewater from other sources. More specifically, this disclosure relates to apparatuses, systems, facilities and methods for removing dissolved volatile organic compounds (VOCs), which are widely considered to be hazardous air pollutants (HAPs), from wastewater. The various VOCs that may be removed from wastewater include, but are not limited to, methanol (i.e., methyl alcohol) and the so-called "BTEX" materials; i.e., benzene, toluene, ethylbenzene and xylene. These materials may be safely removed from wastewater and converted by anaerobic bacteria to less harmful substances (e.g., carbon dioxide ($CO_2$) and water vapor) and methane ($CH_4$), which is natural gas and can be reclaimed and used for the same purposes as natural gas.

In one aspect, a bioreactor, or digester, for treating wastewater may include an anaerobic vessel or partition that provides a favorable environment for anaerobic microorganisms. In addition, the bioreactor may include one or more elements for mixing (continuously, periodically, etc.) the contents of the anaerobic vessel, including the anaerobic microorganisms and any wastewater within the anaerobic vessel.

The anaerobic vessel of a bioreactor may take a variety of configurations, depending at least in part upon the flow rate of wastewater to be treated and the location where the wastewater is to be treated. Where relatively small volumes of wastewater are to be treated (e.g., on the order of hundreds of barrels, 500 barrels or less per day) the anaerobic vessel may comprise a tank, such as a frac tank of the type commonly used in the oil and gas industry. When larger volumes of wastewater are to be treated, the anaerobic vessel of the bioreactor may comprise a pool, pond or other vessel constructed for this purpose at a wastewater treatment facility.

The anaerobic microorganisms of a bioreactor may be selected to metabolize, or digest, various VOCs that have dissolved in the wastewater, including methanol and BTEX materials, while withstanding the harsh conditions that are typically present in wastewater from oil and gas exploration or production (e.g., the VOCs, extreme temperatures, high salinity, sediment, metals and the like.). The ability of the anaerobic microorganisms to metabolize VOCs may be optimized and maintained by carefully monitoring and controlling various conditions within the anaerobic vessel of the bioreactor.

In another aspect, this disclosure relates to systems for treating E&P wastewater, which are also referred to herein as "wastewater treatment systems." In addition to a bioreactor, such a wastewater treatment system may include a variety of other elements, such as: components for isolating the wastewater from light non-aqueous phase liquids (LNAPLs) (e.g., hydrocarbons, etc.), dense non-aqueous phase liquids (DNAPLs) (e.g., crude oil having API gravity of 10 or less) and solid materials (i.e., Sludge); components for recovering hydrocarbons (e.g., oil, gas, etc.) and other LNAPLs from wastewater; and components before reintroducing treated wastewater to the environment (e.g., by evaporation, etc.). In addition, a system for treating wastewater may include one or more components for facilitating the removal of undissolved VOCs from wastewater and eliminating the undissolved VOCs that have been removed, as well as one or more components for filtering any remaining VOCs from treated wastewater.

On a large scale, such a system may be incorporated into a wastewater treatment facility or wastewater treatment site. In the context of a wastewater treatment site, an oil-water separator (OWS), may provide for some initial separation of wastewater from hydrocarbons and sludge. Separation of the wastewater from hydrocarbons and/or sludge may also be achieved in a surge or stilling basin, which may be configured to collect and store a large volume of wastewater until the wastewater can be treated or further processed. In addition to the OWS and stilling basin, a wastewater treatment site may include a bioreactor vessel. In some embodiments, a wastewater treatment site may include one or more methods and types of equipment to reintroduce treated wastewater to the environment. Of course, a wastewater treatment site may also include other elements (e.g., one or more hydrocarbon removal components, flares or incinerators, filters, etc.) that facilitate the removal of VOCs from wastewater, as well as the recovery of hydrocarbons. Each successive component, or location, within the wastewater treatment site may be located at a lower elevation than the previous element, or location, exploiting the force of gravity to move wastewater from one location to the next.

Methods for treating wastewater are also disclosed. Broadly, such a method includes isolating wastewater from phase separable hydrocarbons and solid materials (i.e., Sludge) and removing VOCs from the wastewater. Hydrocarbons dissolved in wastewater may be metabolized by anaerobic bacteria to remove them from wastewater.

In a specific embodiment of a method for treating wastewater, the wastewater may be transported to a wastewater treatment site. An initial separation of the wastewater from hydrocarbons and solids may be effected by introducing the wastewater to an OWS. The hydrocarbons may be recovered, the solids may be disposed of and the wastewater is subjected to further treatment. Further separation of hydrocarbons and solids from the yet-to-be treated wastewater, or untreated wastewater, may be achieved by introducing the wastewater into a stilling basin. The desired level of separation may be accomplished in a stilling basin, partially treated wastewater may be released from the stilling basin into a bioreactor vessel. In a bioreactor, various types of anaerobic microorganisms metabolize dissolved VOCs. Metabolites include substances less toxic to human health such as methane. Following removal of dissolved VOCs (e.g., when the levels of dissolved VOCs in the treated wastewater reach acceptable levels, etc.), the treated wastewater may be released from the bioreactor.

During one or more of the foregoing processes, volatilized hydrocarbons may be removed from the wastewater and flared, or incinerated.

The treated wastewater may be filtered or directed to an evaporation pond, where it may be introduced, by evaporation, back into the environment.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

According to one aspect of this disclosure, a properly configured bioreactor may be configured to remove VOCs dissolved in wastewater from the wastewater, such as E&P wastewater. In various embodiments, a bioreactor may include an anaerobic vessel for the wastewater, as well as anaerobic microorganisms (e.g., anaerobic bacteria) that will metabolize the organic compounds in wastewater, including, but not limited to, VOCs. In some embodiments, the bioreactor may also include a mixing system for distributing the anaerobic microorganisms throughout the wastewater within the anaerobic vessel. A bioreactor may also include an outlet, from which gases that are produced by the anaerobic microorganisms as they metabolize dissolved VOCs may be collected.

Figure 1:
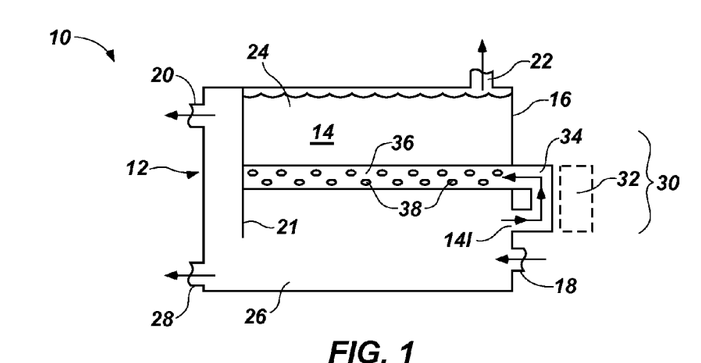
FIG. 1 schematically illustrates an embodiment of a bioreactor for removing VOCs from wastewater.

As shown in FIG. 1, a bioreactor 10 may include a selectively sealed tank 12, which is also referred to hereinafter as a "tank" for the sake of simplicity. The tank 12 includes an interior 14 and an exterior 16, as well as an inlet 18 to the interior 14 of the tank 12 and outlets 20 and 22 to the exterior 16 of the tank 12. In addition to the tank 12, the bioreactor includes wastewater 24 within the interior 14 of the tank 12 and a blend of anaerobic microorganisms 26 in the wastewater 24. A solids (sludge) collection system 28 may communicate with the bottom of the interior 14 of the tank 12. A mixing system 30 associated with the tank 12 may distribute the anaerobic microorganisms 26 throughout the wastewater 24 within the interior 14 of the tank 12.

The tank 12 may have a size conducive to the flow rate of wastewater 24 to be treated by the bioreactor 10. Without limitation, the tank 12 may have a volume on the order of a hundred barrels to a thousand barrels. In a specific embodiment, a so-called "frac tank," of a type commonly used in the oil and gas industry may be used to form the tank 12. When a frac tank is used as the tank 12 of the bioreactor 10, it may have a capacity of about 400 barrels.

Wastewater 24 is introduced into the interior 14 of the tank 12 through the inlet 18 of the tank 12. The outlets 20 and 22 enable removal of substances from the interior 14 of the tank 12 and their communication to locations outside of the tank 12's exterior 16. As illustrated, one of the outlets (i.e., outlet 20 in the illustrated embodiment) may be located near a top of the tank 12 so as to enable clarification of the wastewater 24 (e.g., by gravity, etc.) as the wastewater 24 is removed from the tank 12 (e.g., the wastewater 24, etc.), leaving sludge and the anaerobic bacteria 26 within the interior 14 of the tank 12. In the illustrated embodiment, a vertically oriented baffle 21 creates a physical bather between the majority of the interior 14 of the tank 12 and the outlet 20 to enable clarification of wastewater 24 exiting the interior 14 of the tank 12. The other outlet 22 may also be located near a top of the tank 12 to enable the removal of gases (e.g., methane, etc.) produced during the treatment of the wastewater 24 (e.g., the metabolism of VOCs by the anaerobic bacteria 26, etc.) from the interior 14 of the tank 12, enabling pressure that builds within the interior 14 of the tank 12 to be periodically or continuously released and collected. Of course, a valve may be associated with each of the inlet 18 and the outlets 20 and 22 to control the movement of fluids into or out of the tank 12.

The mixing system 30 may be configured to move the wastewater 24, along with the VOCs and anaerobic microorganisms 26 therein, with low hydraulic shear. In the depicted embodiment, the mixing system 30 includes a low shear pump 32 that draws wastewater 24 into an inlet of a conduit 34 at a first location 141 within the interior 14 of the tank 12 and causes the wastewater 24 to flow into one or more elongated, tubular baffles 36. Each tubular baffle 36 extends along the length of the interior 14 of the tank 12, and may be located anywhere within the tank, including at or near the center of the interior 14 of the tank 12. Each tubular baffle 36 includes a series of holes 38 spaced at various locations along its length. The holes 38, or nozzles fitted with the holes 38, may be fitted with nozzles and may be positioned and oriented to cause the wastewater 24 to flow in a desired manner.

The anaerobic microorganisms 26 within the interior 14 of the tank 12 may comprise one or more different microorganisms (e.g., bacteria, etc.) that metabolize the various VOCs (e.g., BTEX materials, methanol, etc.). Since the VOCs are constantly contained to prevent their introduction into the environment and little or no elemental oxygen (O2) is present in or at the surface of the wastewater 24, the microorganisms which metabolize the VOCs are able to live with little or no free oxygen; i.e., they are anaerobic. As different microorganisms may metabolize one or more types of VOCs, but not all of the different types of VOCs that are typically present in wastewater 24, the anaerobic microorganisms 26 that are used in the bioreactor 10 may include a mixture of different microorganisms. In a specific embodiment, the anaerobic microorganisms 26 comprise a mixture of microorganisms from wastewater treatment plants with sludge having a high total dissolved solids (TDS) content (e.g., a TDS content of about 1,500 mg/L or more, a TDS content of about 2,500 mg/L, etc.). In some embodiments, the anaerobic microorganisms may be acclimated to withstand a TDS content of up to about 20,000 mg/L, up to about 25,000 mg/L, or more.

In a specific embodiment, the anaerobic microorganisms 26 may include a blend of acid formers and methane formers. The acid formers, which may be facultative anaerobes (i.e., they are rugged microorganisms that can survive in both aerobic environments (by respiration) and anaerobic environments (by fermentation)), metabolize organic materials (e.g., VOCs, etc.) by hydrolysis, then ferment the hydrolyzed materials to form acids and alcohols. The methane formers, which are obligate anaerobes (i.e., microorganisms that can only survive in anaerobic environments), metabolize the acids and alcohols generated by the acid formers and any methanol present in the wastewater 24, as well as hydrogen (H2) and carbon dioxide (CO2), to methane (CH3).

In some embodiments, because wastewater 24 sometimes has a high TDS content, (or high salinity), the anaerobic microorganisms 26 may also be selected for their ability to survive or thrive in saline conditions. Microorganisms that can live in saltwater are often referred to as "halotolerant" and include halophilic (i.e., salt loving) microorganisms, which thrive in saltwater.

Because of its size, the bioreactor 10 shown in FIG. 1 may be relatively portable (e.g., be transported on a trailer; comprise part of a tanker, such as a tanker trailer or tanker truck; etc.). The portability of a bioreactor 10 may enable wastewater 24 or other wastewater that includes dissolved VOCs to be treated at or near the site from which such water is obtained.

Figure 2:
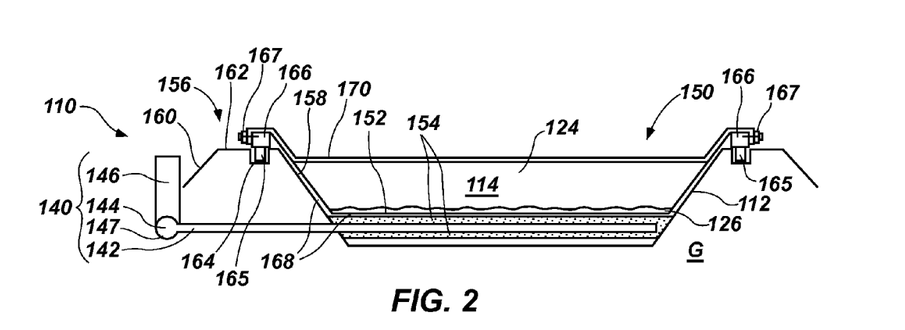
FIG. 2 is a plan view of an embodiment of a large-scale bioreactor that may be included in a wastewater treatment site.
Figure 3:
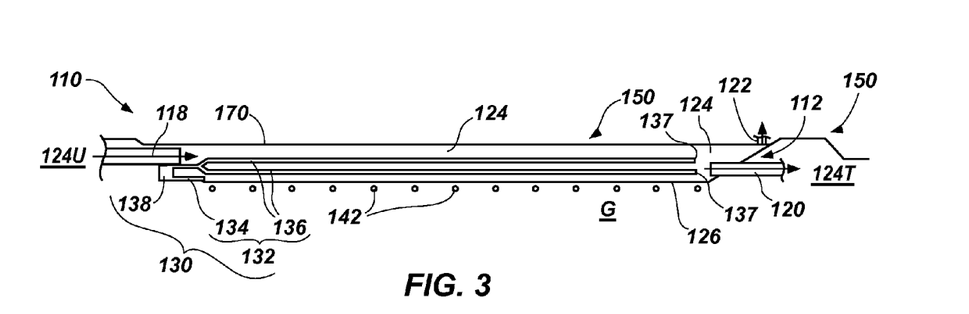
FIG. 3 is a cross-sectional representation of the embodiment of the bioreactor shown in FIG. 2.

Turning now to FIGS. 2 and 3, an embodiment of a much larger scale bioreactor 110 is depicted. Like the smaller version shown in FIG. 1, the bioreactor 110 includes a vessel 112 with an interior 114, an inlet 118, and outlets 120 and 122. The bioreactor 110 also includes anaerobic microorganisms 126 for treating water 124 within the interior 114 of the vessel 112. In addition, the bioreactor 110 may include one or more sludge management systems 128 that communicate with the bottom of the vessel 112's interior 114, a mixing system 130 and a leak detection system 140.

Because the bioreactor 110 is large, its vessel 112 is also large. In various embodiments, the vessel 112 of a large bioreactor may comprise a pool or, as depicted, a pond 150. A pond 150, which may comprise a recessed area formed in the ground, may be constructed to have any desired capacity. Without limitation, the pond 150 may have a capacity of 1,000 barrels or more. In some embodiments, the volume of the pond 150 may be 10,000 barrels or more, or even 50,000 barrels or more (e.g., 55,000 barrels). While various configurations of ponds 150 are within the scope of this disclosure, relatively shallow ponds 150 with relatively large surface areas are desirable, as larger surface areas support more of the anaerobic bacteria 126 of the bioreactor 110.

In embodiments where the pond 150 comprises a recessed area formed in the ground G, a base 152 of the pond 150 may comprise up to twelve inches or more of low-permeability compacted soil. The soil may be compacted to at least 95% of its maximum dry density as measured by ASTM D-698, and have a permeability as measured by a hydraulic conductivity of $1 \times 10^{-7}$ cm/sec or less. A cushion 154 of compacted sand or material having similar hydraulic transmissivity may sit atop the base 152 of the pond 150. An outer periphery of the pond 150 may be defined by an embankment 156, or a berm or a leading, that is raised somewhat relative to the surface of the ground G within which the pond 150 is formed. The embankment 156 may have an interior slope 158 into the interior 114 of the vessel 112 and, thus, of the pond 150, as well as an exterior slope 160 from a crest 162 at the top of the embankment 156 to the surface of the ground G adjacent to the pond 150. In a specific embodiment, the crest 162 may have a width of about 12 feet or more, while the interior slope 158 may be about one foot vertical for every two feet horizontal (1:2) or shallower, and the exterior slope 162 may be about one foot vertical for every two feet horizontal (1:2) or shallower. In a specific but non-limiting embodiment, the pond 150 may be rectangular in shape, with a length of about 400 feet, a width of about 100 feet and a depth of about 20 feet.

The pond 150 may also include an anchoring trench 164 within the crest 162 of the embankment 156. The anchoring trench 164 may be configured to receive anchors 165 for other components of the vessel 112 of the bioreactor 110, as will be described in further detail hereinafter.

In addition to the pond 150, the vessel 112 of the bioreactor 110 may include one or more liners 168 on the base 152 of the pond 150 and on the interior slope 158 of the pond 150's embankment 156. The liner(s) 168 provide(s) a barrier that prevents dissolved VOCs and other potential pollutants in water 124 (e.g., flow-back water, produced water, other E&P wastewater, etc.) within the pond 150 (i.e., within the interior 114 of the vessel 112) from seeping into the ground G. In a specific embodiment, the vessel 112 may include a pair of superimposed sheets of high density polyethylene (HDPE) having a thickness of 60 mils (0.060 inch, or about 1.5 mm). Each liner 168 may be anchored at locations adjacent to its outer periphery. As a non-limiting example, the liners 168 may be anchored within the anchoring trench 164 in the crest 162 of the embankment 152 with suitable anchors 165, such as compacted clay. Further anchoring may be provided by way of a concrete curb 166 disposed over earthen or plastic liners 165 (e.g., constructed directly on top of earthen or plastic liners 165).

The vessel 112 also includes a cover 170, which prevents VOCs in the water 124 in the pond 150 and, thus, within the interior 114 of the vessel 112 from escaping to the atmosphere. The cover 170 may comprise a flexible material, and may be configured to remain in place against the surfaces of the pond 150 and of any wastewater 124 therein as the level of the surface of the water 124 within the pond 150 changes. In embodiments where the cover 170 is flexible, it may accommodate any gases and/or vapors that build up within the bioreactor 110, providing temporary storage for such gases and/or vapors until they can be removed from the bioreactor 110 and treated (e.g., incinerated, burned as fuel, etc.).

In a specific, but non-limiting embodiment, the cover 170 may comprise 40 mil thick fiber reinforced HDPE. Outer peripheral portions of the cover 170 may be anchored in place by securing a brace 167 in place (e.g., with bolts, etc.) over the outer peripheral portions of the cover 170, which are positioned on an outer periphery of the curb 166, to the curb 166. In addition, restraints, such as cables, may be positioned over and extend across one or more locations of the cover 170 to ensure that it remains free from excessive aeolian flutter during high wind events.

The inlet 118 of the vessel 112 is configured to introduce partially treated wastewater 124U into the interior 114 of the vessel 112. The configuration of the inlet 118 of the bioreactor 110 may depend, at least in part, on the source of the wastewater 124U that is to be introduced into the vessel 112. In embodiments where untreated wastewater 124U is to be introduced into the vessel 112 from a tanker, the inlet 118 may simply comprise an opening into which a hose from the tanker may be introduced or a fitting to which a hose from the tanker may be coupled. In embodiments where the partially treated wastewater 124U is transported from another component of a system or site where the bioreactor 110 is located, the inlet 118 may comprise a channel or a conduit that enables the untreated wastewater 124U to flow from an upstream location to the vessel 112.

A liquid outlet 120 of the vessel 112 enables treated wastewater 124T to be removed from the interior 114 of the vessel 112. The configuration of the outlet 120 depends, at least partially, upon the intended destination of the treated wastewater 124T. The liquid outlet 120 may comprise a channel or a conduit that enables the treated wastewater 124T to flow to a location downstream from the vessel 112. In some embodiments, the liquid outlet 120 may comprise a conduit that extends from a location at or near the bottom 152 of the pond 150 to a location at or near the top of the pond 150. A pump may enable water to be removed from the vessel 112 through such an embodiment of liquid outlet 120. In such embodiments, the configuration and/or orientation of the liquid outlet 120 may clarify water as it is removed from the vessel 112.

Gases generated within the vessel 112, including products of the metabolism of VOCs (e.g., $CO_2$, $H_2O$, methane, etc.), may be collected through one or more gas outlets 122 of the vessel 112. Each gas outlet 122 may communicate with or comprise a conduit that vents gasses from the interior 114 of the vessel 112 and, in some embodiments, transports the gases to one or more locations where they may be collected and/or processed.

It may be desirable to maintain a periodic or continuous flow of liquids within the interior 114 of the vessel 112. Accordingly, a mixing system 130 may be associated with the interior 114 of the vessel 112. As will be appreciated by those of ordinary skill in the art, a variety of different types of mixing systems 130 may be employed; FIG. 2 depicts only one embodiment of many possibilities. The depicted mixing system 130 includes at least one conduit 132 with an inlet 134 and one or more baffles 136 (one is shown in the depicted embodiment). Each baffle 136 includes a plurality of outlets 137 (e.g., openings, openings that have been fitted with nozzles, etc.). The depicted mixing system 130 also includes a pump 138, which communicates with the conduit 132 at a location along the length of the conduit 132, between its inlet 134 and each baffle 136. The pump 138 is located and configured to draw fluids from the interior 114 of the vessel 112 and into the inlet 134 of the conduit 132, then force the fluids into each baffle 136 and out of its outlets 137, back into the interior 114 of the vessel 112. Various parameters, such as the amount of pressure generated by the pump 138, the location of each baffle 136, the orientations of the outlets 137 and the pressure generated by the outlets 137, may dictate the manner in which fluids move through (e.g., are circulated within, etc.) the interior 114 of the vessel 112. Such movement may homogenize the contents of the water 124 within the interior 114 and facilitate (e.g., increase the rate of, etc.) removal of VOCs from the water 124. Mechanical mixers may also be installed to augment or replace hydraulic mixing described herein.

In addition to the vessel 112, a bioreactor 110 may include a leak detection system 140. The leak detection system 140 may be associated with the vessel 112 in such a way that any leakage by the vessel 112 may be detected, as may a rate of leakage. In the embodiment illustrated by FIG. 3, the leak detection system 140 may include a plurality of detection pipes 142 that communicate with a collection pipe 144 (see FIG. 2). The collection pipe 144, in turn, communicates with a vertically oriented observation well 146 located outside of the bioreactor vessel or an observation well located inside the vessel.

More specifically, the detection pipes 142 may comprise perforated or water permeable conduits. Each detection pipe 142 may be located at the base of the vessel 112 so as to capture any water that leaks through the primary (plastic sheet) liner may be detected and removed at such a rate as to limit the hydraulic pressure applied to the secondary (lowest) liner(s). In the depicted embodiment, each detection pipe 142 is located at the base 152 of the pond 150, between the layers of the liner 168. In some embodiments, the detection pipe(s) 142, along with underlying portions of a liner 168, be recessed within compacted clay at the base of the pond 150 and optionally surrounded by a course material (e.g., pea gravel, etc.) and/or covered with a water permeable filter cloth. In a specific embodiment, each detection pipe 142 may comprise a four inch diameter. Each detection pipe 142 may be oriented substantially parallel to other, equally spaced detection pipes 142 (e.g., at 50 foot centers relative to one another, etc.), and oriented at an appropriate slope to the collection pipe 144 (FIG. 2), such that any water that flows into a detection pipe 142 will flow downhill to the collection pipe 144 and the time of travel will be sufficient to allow rapid detection of liner failure. The collection pipe 144, or various sections thereof, are also oriented at slight downward angles toward a bottom end 147 (FIG. 2) of the observation well 146 (FIG. 2). From the observation well 146, any leakage of water 124 from the interior 114 of the vessel 112 may be detected. Changes in the level of water within the observation well 146 may also be used to provide an indication of the rate at which water is leaking from the interior 114 of the vessel 112.

The anaerobic microorganisms 126 of the bioreactor 110 may have characteristics that are the same as or similar to the anaerobic microorganisms 26 of the bioreactor 10 described in reference to FIG. 1. For example, the anaerobic microorganisms 126 may reduce or eliminate dissolved VOCs, such as methanol and BTEX in E&P wastewater.

Figure 4:
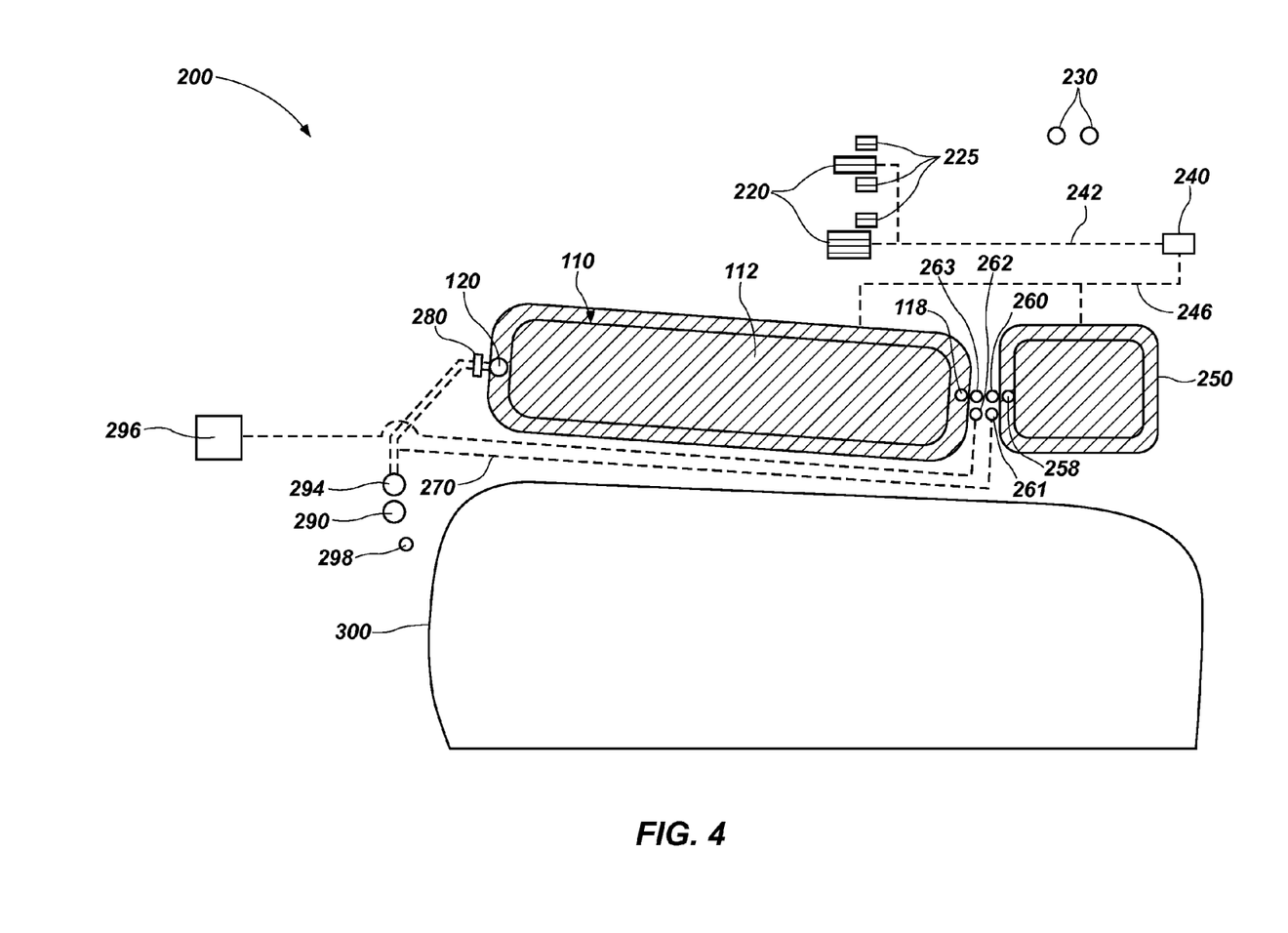
FIG. 4 depicts an embodiment of a wastewater treatment site that includes a bioreactor of the type shown in FIGS. 2 and 3.
Figure 5:
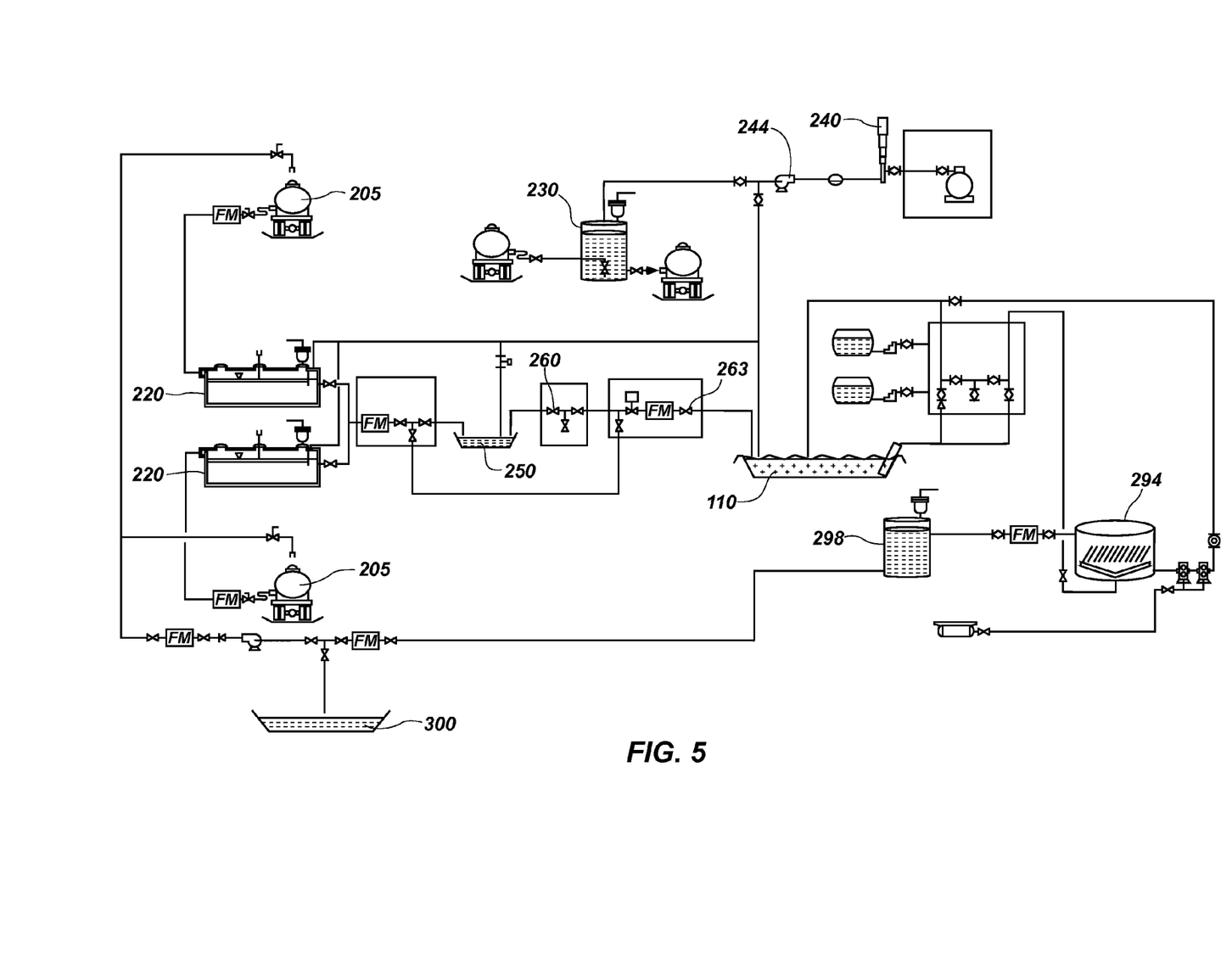
FIG. 5 is a schematic representation of a wastewater treatment site, of which the wastewater treatment site of FIG. 4 is an embodiment.

With reference now directed to FIGS. 4 and 5, an embodiment of a system for treating, or remediating wastewater, such as wastewater obtained during oil or gas exploration or production operations, is illustrated. In particular, FIG. 4 illustrates a water treatment site 200 configured for the large scale treatment of wastewater.

The water treatment site 200 includes a large-scale bioreactor 110, as well as a variety of other components. The various components of the water treatment site 200 are configured to collect large amounts of water (e.g., wastewater, etc.) on a substantially continuous basis. As an example, a water treatment site 200 may be configured to receive and process up to four thousand barrels of wastewater each day.

In some embodiments, the wastewater treatment site 200 may include one or more components that are configured to enable various phases (e.g., LNAPLs, water, sludge, etc.) to separate from one another, a bioreactor (e.g., bioreactor 110, an embodiment of which is depicted by FIGS. 2 and 3, etc.) and, optionally, one or more downstream treatment elements, such as a filter, a clarifier, one or more evaporation ponds, or the like.

Among the various components of the embodiment of water treatment site 200 shown in FIGS. 4 and 5 are one or more oil water separators (OWS) 220, one or more storage tanks 230, a flare 240 or incinerator, a stilling basin 250, one or more bioreactors 110, a filter 290 and one or more evaporation ponds 300.

The OWS 220 may comprise an in-ground tank that is configured to receive up to four thousand barrels of E&P wastewater daily and hold several thousand, or more, barrels of liquid. As wastewater is typically accompanied by residual hydrocarbons and sludge including, but not limited to, gasoline and diesel range organics, heavy oils, waxes and sludge, the OWS 220 may be the first component of the water treatment site 200 where wastewater is processed. Specifically, the separator 220 may be configured to receive wastewater and to hold the wastewater for a sufficient period of time to enable the LNAPLs, water and sludge to separate.

Wastewater, such as E&P wastewater may be delivered to the water treatment site 200 and to the OWS 220 by tankers 205. Accordingly, the OWS 220 may be positioned at a location of the water treatment site 200 accessible to large trucks and tractor-trailers. In addition, in order to facilitate the flow of wastewater through the water treatment site 200, the OWS 220 may be positioned at a higher elevation than other, downstream components of the water treatment site 200. The OWS 220 comprises a vessel configured to facilitate an initial, rough separation of various phases (i.e., LNAPLs, water, sludge, etc.) from the wastewater. In some embodiments, the separator 220 may be configured to remain sealed or substantially sealed from the environment (e.g., to prevent the release of VOCs and into the atmosphere, etc.) as various phases of the wastewater separate from one another. The OWS 220 may operate under a vacuum (e.g., not greater than ten inches of water).

A hydrocarbon recovery unit 225 may be configured for use with each OWS 220 to remove hydrocarbons and other LNAPLs from within the OWS 220. In a specific embodiment, the hydrocarbon recovery unit 225 may comprise a low-shear pump (e.g., a peristaltic pump, an air-operated diaphragm pump, a gear pump, etc.) and a conduit. The pump may be associated with the conduit in a manner that, while gradually lowering the conduit into the LNAPLs and other hydrocarbons near the top of the contents of the OWS 220, enables LNAPLs to be drawn from the OWS 220 and transported to a storage tank 230. The conduit may be configured (e.g., with a transparent region, etc.) to enable viewing of the contents of the conduit; for example, to enable a determination of whether LNAPLs or water are flowing through the conduit as the conduit is lowered into the OWS 220. In another specific embodiment, the hydrocarbon recovery unit 225 may comprise an auto-skimmer of known type. A conduit of a hydrocarbon recovery unit 225 may direct the LNAPLs into a tanker. Alternatively, the conduit of such an embodiment of hydrocarbon recovery unit 225 may transport the LNAPLs to a storage tank 230.

Limited, one-directional gas and/or vapor communication between each OWS 220 and the flare 240 may be established by way of a conduit 227 between the OWS 220 and the flare 240 equipped with check valves or detonation arrestors.

A flare 240, or incinerator, and its associated fuel source (e.g., a tank of propane, etc.) may be present at a wastewater treatment site 200 to receive gas and/or vapors from one or more other components of the wastewater treatment site 200. By way of example, the flare 240 may receive gas and/or vapors from one or more of the OWS 220, the stilling basin 250 and bioreactor 110. As the flare 240 receives gases and/or vapors, such as any VOCs, it may incinerate those gases or vapors to form less harmful byproducts that may then be released into the atmosphere. The burner 240 may have any suitable configuration known in the art.

One or more conduits 242, or "vapor lines," may communicate gases and/or vapors from one or more other components of the wastewater treatment site 200 to the flare 240. The gases and/or vapors may be drawn into and through each conduit 242 to the flare 240 by way of a negative pressure source 244. In a specific but non-limiting embodiment, the negative pressure source 244 may comprise a regenerative blower, which may draw a vacuum of about five inches of water, and may draw a vacuum of up to about 60 inches of water.

In addition to drawing gases and/or vapors off of one or more components of the wastewater treatment site 200, the negative pressure source 244 may apply a vacuum to those components. When the negative pressure source 244 communicates with the stilling basin 250 and/or the bioreactor 110, any vacuum applied to either of those components may draw the cover (not shown for the stilling basin 250, cover 170 (see FIG. 3) of the bioreactor 110) of that component onto the surface of its contents (e.g., the wastewater therein, etc.), which may provide a substantially anaerobic environment or a totally anaerobic environment within the stilling basin 250 and the bioreactor 110, and may prevent billowing of the cover(s) 170.

Wastewater may be communicated from the OWS 220 to downstream components of the wastewater treatment site 200 by way of a conduit 246 and, optionally, one or more valves. In the embodiment of wastewater treatment site 200 illustrated by FIG. 4, the conduit 246 may extend to the stilling basin 250.

At the stilling basin 250, further separation of residual LNAPLs (e.g., hydrocarbons, etc.) and sludge (e.g., DNAPLs, solids, etc.) from the water may be achieved. The volume of the stilling basin 250 is significantly larger than the volume of the OWS 220. Thus the water may reside in the stilling basin 250 for a much longer period of time than it may reside within the OWS 220 without disrupting the rate at which wastewater may be delivered to and treated by the wastewater treatment site 200. Accordingly, the stilling basin 250 may also be referred to as a "surge pond." The stilling basin 250 may, in some embodiments, have a capacity of 10,000 barrels or more (e.g., 50,000 barrels, 80,000 barrels, 100,000 barrels, etc.). In order to prevent any VOCs that are dissolved in the water from escaping into the environment, the stilling basin 250 may be configured in a manner similar to the vessel 112 of the bioreactor 110 shown in FIGS. 2 and 3. For example, the stilling basin 250 may be surrounded by an embankment, the base of the pond and an interior slope of the embankment may be covered with a liner, and a cover may be disposed over the contents of the stilling basin 250 (which cover may be configured similar to and function in a similar manner to the cover 170 (see FIG. 3) of the bioreactor 110). In addition, the stilling basin 250 may include a leak detection system similar to the leak detection system 140 shown in FIG. 3.

Since the primary purpose of the stilling basin 250 is to enable further separation of LNAPLs, such as hydrocarbons, and sludge from the wastewater, hydrocarbon and sludge collection systems may also be associated with the stilling basin 250. LNAPLs may be removed from the stilling basin 250 in any suitable manner. As an example, an auto-skimmer of known type may be used to remove LNAPLs from the surface of the wastewater. As another example, as described below, LNAPLs may be separated from wastewater at an outlet of the stilling basin 250.

Any LNAPLs collected from the stilling basin 250 may be placed in a collection tank and, ultimately, transported to a storage tank 230, where the LNAPLs will be stored until sufficient volumes are collected to justify their transportation from the water treatment site 200 to a refinery.

Water may be removed from (e.g., flow out of, be pumped out of, etc.) the stilling basin 250 through an outlet 258 of the stilling basin 250. In the depicted embodiment, one or more valves 260, 261, 262, 263 may control the flow of water out of the stilling basin 250 to locations downstream from the stilling basin 250. When valve 260 is closed, no water may flow from the outlet 258 of the stilling basin 250. Conversely, when the valve 260 is open, water may flow through the outlet 258 and, thus, out of the stilling basin 250.

Further, in embodiments where two or more valves 260, 261, 262 and 263 are associated with the outlet 258 of the stilling basin 250, the valves 261, 262 and 263 may be selectively operated in a manner that controls the destination of the water as it flows from the outlet 258 of the stilling basin 250. For example, when valves 260 and 263 are open and valve(s) 261, 262 is (are) closed, water may flow from the outlet 258 of the stilling basin 250 to the inlet 118 of the vessel 112 of the bioreactor 110. In embodiments where the bioreactor 110 is located at a lower elevation than the stilling basin 250, the water may flow under force of gravity. Alternatively, when valve 260 and valve 261 are open and valve(s) 262, 263 is (are) closed, water may flow into a bypass system 270, which bypasses the bioreactor 110, and may also enable the water to flow downstream to another component (e.g., a filter 290, a clarifier 294, etc.) of the wastewater treatment site 200. The bypass system 270 may be configured to enable the communication of water directly from the stilling basin 250 to a filter 290.

As another alternative, when valves 260 and 262 are open and valve(s) 261, 263 is (are) closed, LNAPLs and possibly water may flow to another downstream component of the wastewater treatment site 200, such as a holding tank 296. When the valves 260-263 are oriented with valves 260 and 262 open and valve(s) 261, 263 closed, and in embodiments where the outlet 258 from the stilling basin 250 comprises a conduit with an upper limit at a known elevation, the valves 260-263 and the outlet 258 may be used together to remove LNAPLs from the surface of wastewater within the stilling basin 250. More specifically, wastewater may be removed from the stilling basin 250 until an upper surface of the wastewater is level with the upper limit of the outlet 258. Depending upon the orientations of valves 261 and 263, the wastewater may be directed into the bioreactor 110 or allowed to bypass the bioreactor 110. Once the interface between the wastewater and any LNAPLs on the surface of the wastewater (i.e., the upper surface of the wastewater and, thus, the lower surface of any LNAPLs on the surface of the wastewater) is at the same elevation as, or level with, the upper limit of the outlet 258, the orientations of valves 262 and 261, 263 may be switched (e.g., valve 261, 263 may be closed and valve 262 may be opened), directing the LNAPLs that flow through the outlet 258 to a location other than the bioreactor 110 or any other downstream destination for the wastewater. In a specific embodiment, the LNAPLs may be directed into a collection tank 265, where any water that accompanied the LNAPLs out of the stilling basin 250 may be allowed to separate from the LNAPLs. The LNAPLs may be taken to a storage tank 230. The water may be reintroduced into the stilling basin 250, introduced into the bioreactor 110 or transported to another downstream treatment component of the wastewater treatment site 200.

As disclosed previously herein, the filter 290 may receive wastewater from the bypass system 270. The filter 290 may also be positioned and configured to receive water from the liquid outlet 120 of the bioreactor 110; the flow of water from the liquid outlet 120 of the bioreactor 110 may be controlled by a valve 280.

The filter 290 may be configured to remove at least some VOCs, from the water. Without limitation, the filter 290 may comprise a walnut shell filter of a known type. However, the filter may be selected for removal of known VOCs, not effectively removed by the bioreactor 110.

Alternatively, the wastewater treatment site 200 may be configured to enable water that flows from the bioreactor 110 to bypass the filter 290.

In addition to the filter 290, or as an alternative, the wastewater treatment site 200 may include a clarifier 294. The clarifier 294, which may be configured in any suitable manner known in the art, may be located downstream from the bioreactor 110 and configured to remove sludge from water that has been treated by the bioreactor 110.

Water from the filter 290 and/or the clarifier 294 may be introduced into a break tank 298, which may be configured to load the treated water into a tanker 205. Alternatively, the treated water may be introduced into one or more other treatment components (e.g., another filter, a reverse osmosis (RO) system, an evaporation pond 300, etc.), which may be located downstream from the bioreactor 110, the filter 290 and/or the clarifier 294. In the embodiment of wastewater treatment site 200 illustrated by FIG. 4, water from the bioreactor 110 and/or the filter 290 may flow into one or more evaporation ponds 300. Each evaporation pond 300 may be located at a lower elevation than the bioreactor 110 and/or the filter 290, and may be configured in a manner known in the art. In embodiments where a wastewater treatment site 200 includes a plurality of evaporation ponds 300 arranged in series with one another, each successive evaporation pond 300 may be located at a lower elevation than the preceding evaporation pond 300. In order, upstream to downstream, the LNAPL content in water decreases from one evaporation pond 300 to the next, while the content of TDSs, including salt, in the water increases from one evaporation pond 300 to the next. More specifically, each evaporation pond 300 may be configured to receive wastewater with reduced, environmentally acceptable levels of dissolved VOCs, or "treated water," and to gradually introduce the treated water back into the environment; e.g., by enabling the same to be evaporated into the atmosphere or, after the treated water has been further treated to comply with governmental regulations, reintroduced to surface and ground water.

In embodiments where the wastewater treatment site 200 includes a clarifier 294, sludge from the clarifier 294 may be transported back to the bioreactor 110.

A wastewater treatment site 200 may comprise a system that is configured to be closed and/or sealed from the OWS 220 to the bioreactor 110, or even from the OWS 220 to the filter 290. Of course, the interiors of one or more components of a system that is configured to be closed may be selectively accessed (e.g., to remove LNAPLs, to remove sludge, etc.), and the system may be configured to produce treated water and emissions that are less harmful than the VOCs that are emitted from wastewater that has not yet been fully treated.

With continued reference to FIGS. 4 and 5, various elements of a method for treating wastewater (in addition to those that should already be apparent from the foregoing description) are now described. Although the context for the ensuing description is a wastewater treatment site 200, the portions of the disclosed method that relate to treatment of wastewater in a bioreactor 110 may be employed in any system, regardless of whether or not the bioreactor is 110 configured in the manner shown in FIG. 2 or 3 or any other way (e.g., as shown in FIG. 1, etc.) and regardless of the environment in which the bioreactor 110 is situated.

Initially, LNAPLs and, optionally, sludge may be separated from the wastewater. Separation may be achieved by any suitable means; use of the OWS 220 and/or the stilling basin 250 disclosed herein are merely a couple of examples. Separation may be effected by gravity, centrifugation or any other suitable technique.

In the context of a wastewater treatment site, wastewater may be brought to the wastewater treatment site 200 by way of a tanker 205. More specifically, the tanker 205 may be positioned in proximity to a OWS 220. The wastewater from the tanker 205 may be delivered into the OWS 220 in any suitable manner. In some embodiments, delivery of the wastewater into the OWS 220 may be effected in a way that prevents introduction of VOCs into the environment.

Prior to removing any LNAPLs or sludge from the OWS 220, the gas and/or vapor content of the OWS 220 may be monitored. In the event that harmful gases are present, those gases may be drawn out of the OWS 220 before it is opened and incinerated or otherwise treated.

The wastewater may be allowed to remain in the OWS 220 for a sufficient period of time (e.g., a few hours, a few days, etc.) to enable LNAPLs (e.g., oil, gas, other hydrocarbons, etc.) that have mixed with the wastewater to separate from the wastewater. Once LNAPLs have separated from the wastewater, they may be removed from the OWS 220 and stored in a storage tank 230, where they may be kept until a sufficient volume of LNAPLs is collected to transport and sell (e.g., to a refinery, etc.). In addition to allowing LNAPLs to separate from the wastewater, sludge (e.g., DNAPLs, solids, etc.) may drop to the bottom of the OWS 220 while the wastewater sits therein. The solids, which may be referred to as "sludge," may be periodically or occasionally collected from the OWS 220.

In embodiments where the OWS 220 may be opened to remove LNAPLs or sludge, the gases and/or vapors within the OWS 220 may be monitored prior to accessing its contents. As an example, levels of hydrogen sulfide and other toxic materials or pollutants may be monitored prior to opening the OWS 220, and, if such materials are present, they may be removed from the OWS 220 (e.g., drawn out of the OWS 220 and incinerated, etc.). As another example, oxygen levels within the OWS 220 may be monitored.

Once the initial, or rough, separation of LNAPLs from the wastewater is complete, the wastewater may be transported to a flare 240, where gases and/or vapors (e.g., undissolved VOCs, other potential pollutants, etc.) from the wastewater may be burned to form less harmful byproducts, which may then be released into the environment. In embodiments where the stilling basin 250 includes a flexible cover, a negative pressure that draws gases and/or vapors from the stilling basin 250 may continuously draw the flexible cover against the surface of the contents of the stilling basin 250. Optionally, a flexible cover of a stilling basin 250 may be configured to accommodate gases and/or vapors even when the rate at which they are emitted from the wastewater exceeds the rate at which they are drawn from the stilling basin 250 (i.e., the cover may accommodate surges in gas and/or vapor production).

Following the initial, rough separation of LNAPLs and sludge from the wastewater, as well as any optional flaring, further separation of LNAPLs and/or sludge from the wastewater may occur. In some embodiments, the wastewater may reside within a stilling basin 240 for a prolonged period of time. Any LNAPLs that collect at the surface of the wastewater may be collected and placed in a storage tank 230. Any solids that drop to the bottom of the stilling basin 250 may remain there until the solids, or sludge, are removed from the stilling basin 250. The recovered sludge may be used for other purposes; for example, to form hardened roadway surfaces (e.g., at oil or gas exploration or production facilities, etc.).

Once sufficient separation has been achieved and LNAPLs have been removed from the wastewater, the wastewater may be examined to determine whether or not it is suited for introduction into the bioreactor 110, or to determine how it should be introduced into the bioreactor 110. As an example of such examination, the wastewater may be tested for the presence of biocides, which are sometimes added to water used during exploration and/or production. If undesirably high levels of biocides are detected (e.g., sufficient levels to disturb the anaerobic bacteria 126 of the bioreactor 110, etc.), the wastewater may bypass the bioreactor 110 and proceed to alternative treatment components.

As another example, the salt content or content of other TDSs in the wastewater may be determined. If the salt and/or TDS content of the wastewater is undesirably high (e.g., at or above a level that would have a detrimental effect on the anaerobic bacteria 126 when introduced into the bioreactor 110, etc.), the volume of wastewater that is introduced into the bioreactor 110 may be limited (e.g., to an amount that will not increase the salt or TDS content of the wastewater within the bioreactor 110 by more than a fixed amount (e.g., five percent, ten percent, etc.) until wastewater with a lower salt or TDS content is available (e.g., until the levels of salt and/or other TDSs in the wastewater in the stilling basin 250 are diluted, etc.). Optionally, the introduction of wastewater into the bioreactor 110 may be delayed until the TDS content of the wastewater in the stilling basin 250 reaches acceptable levels for introduction into the bioreactor 110 by dilution from added wastewater, etc.). As another option, fresher water may be added to wastewater with a high salt content or TDS content to dilute the same. As yet another option, wastewater with a high content of salt or other TDSs may bypass the bioreactor 110. In some embodiments, the introduction of wastewater with a low salt or TDS content into the bioreactor 110 may also be limited; for example, to volumes that will not decrease the salt or TDS content of wastewater within the bioreactor 110 by more than a fixed amount (e.g., five percent, ten percent, etc.). Moderation of the levels of salt and/or other TDSs within the bioreactor may minimize any detrimental effect on the bacteria 126 within the bioreactor 110.

Once the wastewater has been introduced into the bioreactor 110, it may remain there from a sufficient period of time to enable the anaerobic bacteria 126 to metabolize VOCs and, optionally, other LNAPLs that remain within the wastewater. In some embodiments, the wastewater may be periodically mixed. Mixing may be effected by turbulence as wastewater is introduced into the bioreactor, by recirculating wastewater within the bioreactor, or otherwise, as known in the art.

All or substantially all gases and vapors that are present within the bioreactor 110 (e.g., over the surface of the wastewater therein and beneath the cover 170, etc.) may be removed from the bioreactor 110 (e.g., drawn therefrom, etc.), creating a substantially or totally anaerobic environment within the vessel 112 of the bioreactor 110. In embodiments where the cover 170 of the bioreactor 110 is flexible, the cover 170 may accommodate gases and/or vapors even when the rate at which they are emitted from the wastewater exceeds the rate at which they are drawn from the bioreactor 110 (i.e., the cover 170 may accommodate surges in gas and/or vapor production). The gases and/or vapors that are drawn from the bioreactor 110 may be transported to the flare 240, where they may be incinerated.

In some embodiments, including those where the vessel 112 of the bioreactor 110 includes a pond 150, portions of the wastewater may be periodically or occasionally removed, meaning that some of the wastewater may be removed shortly after it has been introduced into the bioreactor 110. In any event, the anaerobic bacteria 126 of the bioreactor 110 may remove sufficient levels of VOCs and other LNAPLs from the wastewater.

Once wastewater is recovered from the bioreactor 110, or in embodiments where wastewater bypasses the bioreactor 110, the wastewater may be subjected to further treatment. Examples of such treatment include filtering to remove VOCs or other HAPs, reverse osmosis, clarification, placing the wastewater in one or a series of evaporation ponds, or any other suitable process. The wastewater may be reintroduced into the environment, it may be used in exploration or production operations or it may be used for other acceptable purposes.

Any sludge that accompanies the treated water out of the bioreactor 110 may be removed from the treated water and disposed of or returned to the bioreactor 110. In some embodiments, the sludge may be fortified with nutrients (e.g., ammonia, phosphoric acid, etc.) before it is returned to the bioreactor 110. Alternatively, sludge from the bioreactor 110 (which may have been removed with wastewater or separately from the wastewater) may be used to seed another bioreactor 110.

Although the foregoing description contains many specifics, these should not be construed as limiting the scopes of the inventions recited by any of the appended claims, but merely as providing information pertinent to some specific embodiments that may fall within the scopes of the appended claims. Features from different embodiments may be employed in combination. In addition, other embodiments of the invention may also lie within the scopes of the appended claims. All additions to, deletions from and modifications of the disclosed subject matter that fall within the scopes of the claims are to be embraced by the claims

What is claimed:

1. A wastewater treatment facility, comprising:
at least one physical separator for receiving wastewater from oil or gas exploration or production and for enabling hydrocarbons remaining mixed with the wastewater to separate from the wastewater, wherein the at east one physical separator is configured to receive the wastewater and the hydrocarbons from a tanker, wherein the at least one physical separator comprises:
a stilling basin, including;
a pond;
a liner at a base of the pond for preventing the wastewater and the hydrocarbons from seeping into the ground adjacent to and beneath the pond;
a cover positioned over the pond for preventing volatile organic compounds dissolved in the wastewater from escaping into the atmosphere; and
an outlet,
the wastewater treatment facility further comprising:
a stilling basin outlet valve at the outlet of the stilling basin for controlling flow of the wastewater from the stilling basin;
a bioreactor positioned to receive the wastewater from the at least one physical separator and to remove organic compounds from the wastewater, the bioreactor comprising;
an inlet for receiving the wastewater;
a pond for containing the wastewater;
a plurality of anaerobic microorganisms in the pond and tailored to metabolize the organic compounds dissolved in the wastewater;
a liner at a base of the pond for preventing the wastewater and the plurality of anaerobic microorganisms from seeping into the ground adjacent to and beneath the pond;
a cover positioned over the pond to prevent organic compounds in the wastewater from escaping into the atmosphere; and
an outlet;
a bioreactor outlet valve at the outlet of the bioreactor for controlling flow of the wastewater out of the pond; and at least one additional treatment compound downstream from the bioreactor outlet valve, the at least one additional treatment component comprising at least one evaporation pond, wherein the pond of the stilling basin in at a higher elevation than the pond of the bioreactor and the pond of the bioreactor is at a higher elevation than the at least one evaporation pond.

2. A wastewater treatment facility, comprising:
at least one physical separator for receiving wastewater from oil or gas exploration or production and for enabling hydrocarbons remaining mixed with the wastewater to separate from the wastewater;
a bioreactor positioned to receive the wastewater from the at least one physical separator and to remove organic compounds from the wastewater, the bioreactor comprising:
an inlet for receiving the wastewater:
a pond for containing the wastewater;
a plurality of anaerobic microorganisms in the pond and tailored to metabolize the organic compounds dissolved in the wastewater;
a liner at a base of the pond for preventing the wastewater and the plurality of anaerobic microorganisms from seeping into the ground adjacent to and beneath the pond;
a cover positioned over the pond to prevent organic compounds in the wastewater from escaping into the atmosphere; and
an outlet;
a bioreactor outlet valve at the outlet of the bioreactor for controlling flow of the wastewater out of the pond; and
at least one additional treatment component downstream from the bioreactor outlet valve, wherein the at least one additional treatment component comprises a filter for removing organic compounds from the wastewater, wherein the at least one additional treatment component further includes an evaporation pond downstream from the filter.

3. A wastewater treatment facility, comprising:
at least one physical separator for receiving wastewater from oil or gas exploration or production and for enabling hydrocarbons remaining mixed with the wastewater to separate from the wastewater;
a bioreactor positioned to receive the wastewater from the at least one physical separator and to remove organic compounds from the wastewater, the bioreactor comprising:
an inlet for receiving the wastewater
a pond for containing the wastewater;
a plurality of anaerobic microorganisms in the pond and tailored to metabolize the organic compounds dissolved in the wastewater;
a liner at a base of the pond for preventing the wastewater and the plurality of anaerobic microorganisms from seeping into the ground adjacent to and beneath the pond;
a cover positioned over the pond to prevent organic compounds in the wastewater from escaping into the atmosphere; and
an outlet;
a bioreactor outlet valve at the outlet of the bioreactor for controlling flow of the wastewater out of the pond; and
at least one additional treatment component downstream from the bioreactor outlet valve, wherein the at least one additional treatment component comprises a filter for removing organic compounds from the wastewater; and
a bioreactor bypass conduit for transporting the wastewater from the at least one physical separator. directly to the filter.

4. A wastewater treatment facility, comprising;
at least one physical separator for receiving wastewater from oil or gas exploration or production and for enabling hydrocarbons remaining mixed with the wastewater to separate from the wastewater;
a bioreactor positioned to receive the wastewater from the at least one physical separator and to remove organic compounds from the wastewater, the bioreactor comprising;
an inlet for receiving the wastewater;
a pond for containing the wastewater;
a plurality of anaerobic microorganisms in the pond and tailored to metabolize the organic compounds dissolved in the wastewater;
a liner at a base of the pond for preventing the wastewater and the plurality of anaerobic microorganisms from seeping into the ground adjacent to and beneath the pond;
a cover positioned over the pond to prevent organic compounds in the wastewater from escaping into the atmosphere; and
an outlet;
a bioreactor outlet valve at the outlet of the bioreactor for controlling flow of the wastewater out of the pond; and
at least one additional treatment component downstream from the bioreactor outlet valve, wherein the at least one additional treatment component comprises a filter for removing organic compounds from the wastewater, wherein the at least one additional treatment component further includes an evaporation pond downstream from the filter;
wherein the bioreactor further includes a leakage monitoring system for detecting leaks in the liner, the leakage monitoring system including:
a porous conduit beneath the pond;
gravel surrounding the porous conduit; and
an observation well adjacent to the pond of the bioreactor and in communication with the porous conduit.

5. A bioreactor for removing volatile organic compounds dissolved in wastewater from the wastewater, the bioreactor comprising:
an anaerobic vessel for receiving wastewater with volatile organic compounds dissolved therein, wherein the anaerobic vessel comprises a frac tank; and
a plurality of anaerobic microorganisms within the anaerobic vessel, the plurality of microorganisms capable of metabolizing the volatile organic compounds, including methanol, benzene, toluene, ethylbenzene and xylene, in the wastewater; and
a mixing system for homogenizing the wastewater within the frac tank, wherein the mixing system comprises:
a low shear pump for drawing the wastewater from the frac tank; and
baffles in communication with the low shear pump for reintroducing the wastewater into the frac tank.

6. The bioreactor of claim 5, wherein the plurality of anaerobic microorganisms:
comprises halotolerant bacteria;
will remove substantially all of the methanol from the wastewater; and
will remove at least half of the benzene, toluene, ethylbenzene and xylene from the wastewater.

* * * * *